No. 684,778. Patented Oct. 22, 1901.
W. M. BARNES.
CLOTHES DRYING MACHINE.
(Application filed Feb. 19, 1901.)

(No Model.) 3 Sheets—Sheet 1.

No. 684,778. Patented Oct. 22, 1901.
W. M. BARNES.
CLOTHES DRYING MACHINE.
(Application filed Feb. 19, 1901.)

(No Model.) 3 Sheets—Sheet 2.

Witnesses:
Jesse B. Heller.
M. F. Ellis

Inventor:
William M. Barnes
Hert Harding
Attorneys.

No. 684,778. Patented Oct. 22, 1901.
W. M. BARNES.
CLOTHES DRYING MACHINE.
(Application filed Feb. 19, 1901.)
(No Model.) 3 Sheets—Sheet 3.
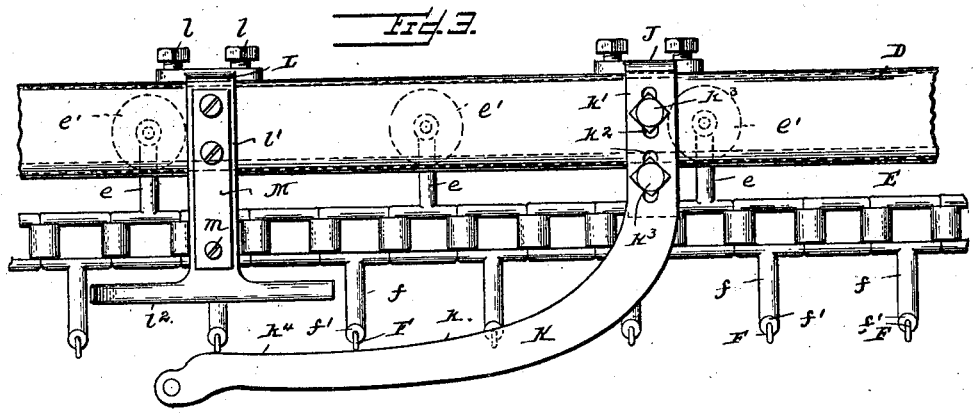
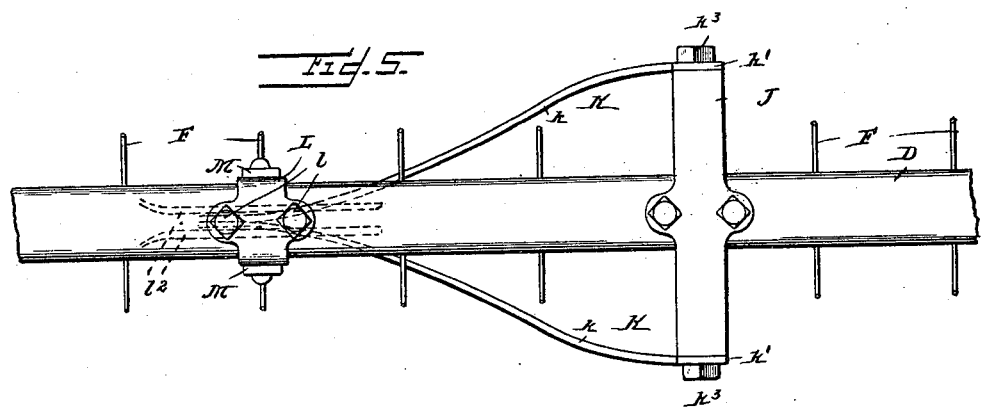
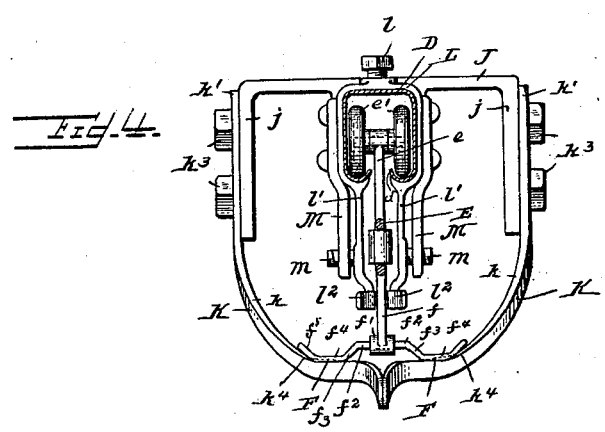
Witnesses:
Jesse B. Heller.
M. H. Ellis.
Inventor:
William M. Barnes
per Harding & Harding
Attorneys.

UNITED STATES PATENT OFFICE.

WILLIAM M. BARNES, OF PHILADELPHIA, PENNSYLVANIA.

CLOTHES-DRYING MACHINE.

SPECIFICATION forming part of Letters Patent No. 684,778, dated October 22, 1901.

Application filed February 19, 1901. Serial No. 47,905. (No model.)

*To all whom it may concern:*

Be it known that I, WILLIAM M. BARNES, a citizen of the United States, residing at Philadelphia, county of Philadelphia, and State of Pennsylvania, have invented a new and useful Improvement in Clothes-Drying Machines, of which the following is a full, clear, and exact description, reference being had to the accompanying drawings, which form a part of this specification.

My invention relates to that class of clothes-drying machines in which the goods to be dried are conveyed by an endless chain or carrier to and through a drying-room and are automatically removed from the conveyer after having passed through the drying-room.

My invention has for its object certain improvements whereby the goods are properly and with certainty removed from the conveyer.

I will first describe the embodiment of my invention illustrated in the accompanying drawings and then specifically point out the invention in the claims.

Figure 1:
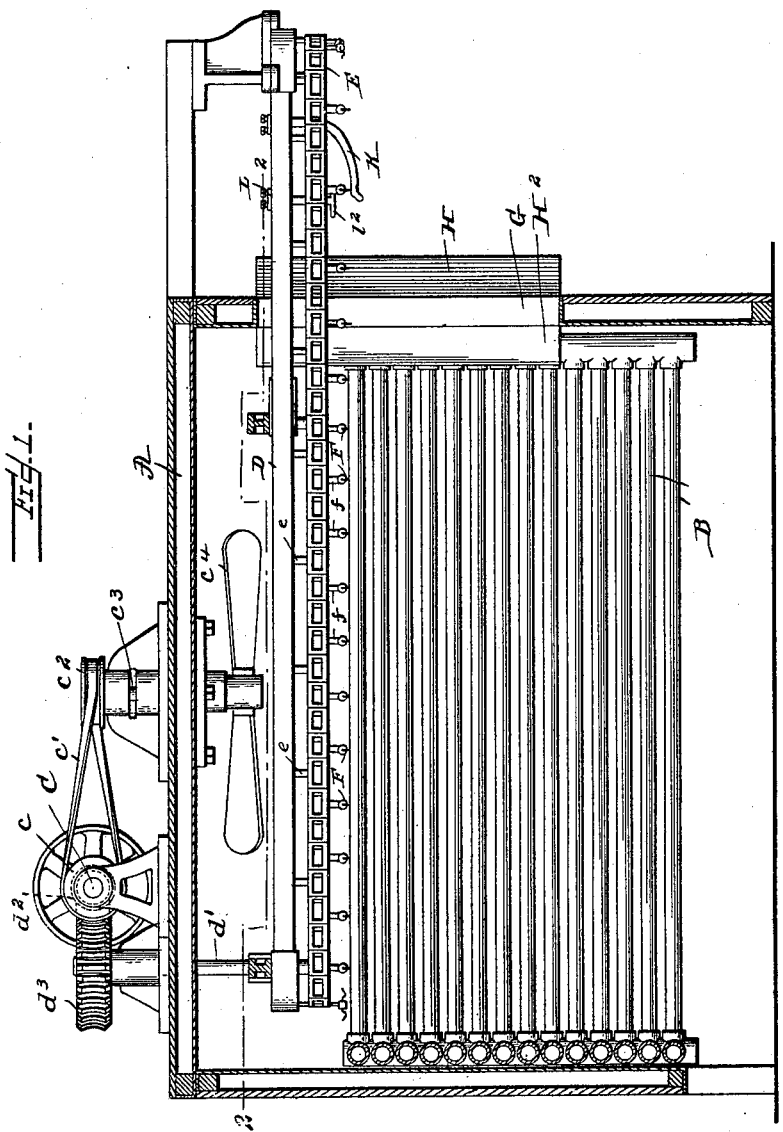
Figure 2:
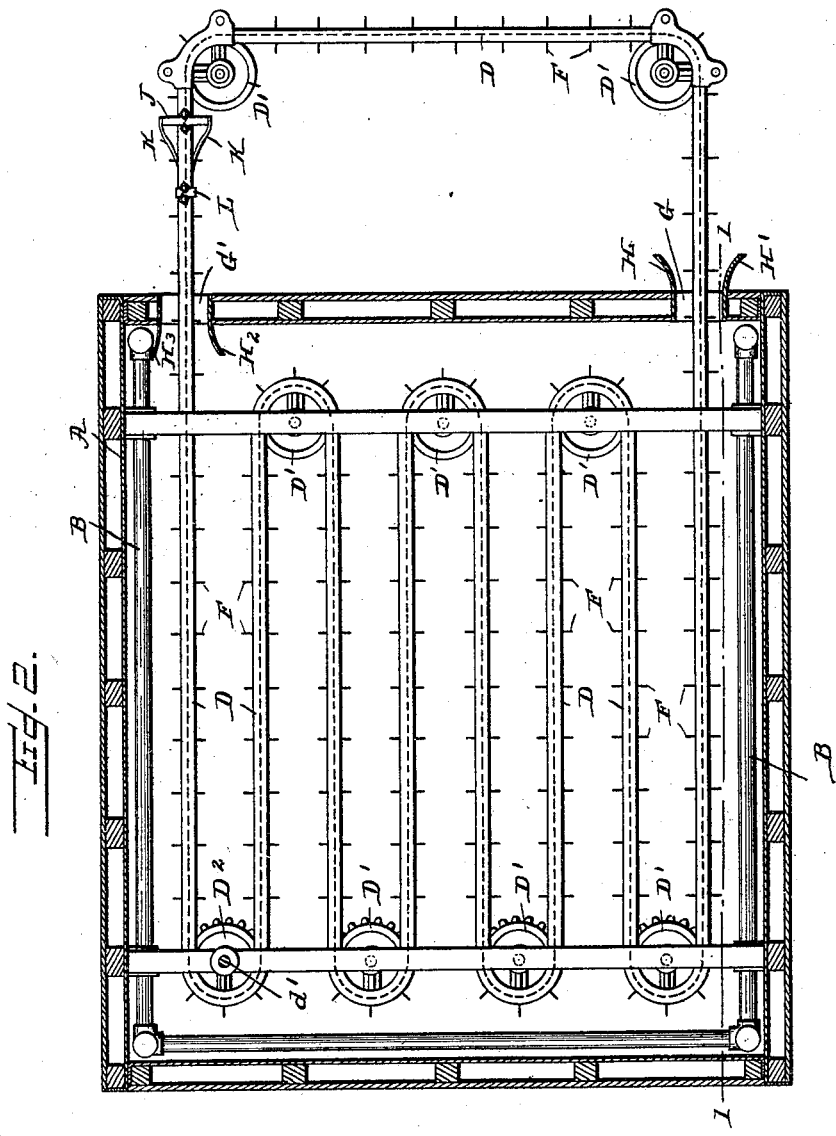

In the drawings, Figure 1 is a section on the line 1 1, Fig. 2. Fig. 2 is a section on the line 2 2, Fig. 3. Fig. 3 is a detail side elevation of the stripping mechanism. Fig. 4 is an end view of same. Fig. 5 is a plan view of same.

A is the drying-room; B, the heating-coils therein; C, a shaft driven from the source of power; $c$, a pulley thereon; $c'$, a belt extending to a pulley $c^2$ on the shaft $c^3$, on which latter shaft, within the drying-room, is the fan $c^4$.

D is an endless track, inverted-U-shaped, having the flanges $d$.

D' represents pulleys, and D² a sprocket-driving wheel the shaft $d'$ of which is driven by the worm $d^2$ and worm-wheel $d^3$.

E is a link conveyer-chain, having at intervals the shank $e$, to which is connected the rollers $e'$. The shank projects between the flanges $d$, the rollers $e'$ resting and traveling on the flange $d$. Projecting downward from the chain E at intervals are the shanks $f$, having at their lower ends the hub $f'$, to which are attached on opposite ends pins F. These pins have a horizontal portion $f^2$ where connected to the hub, then a downward angular portion $f^3$, then a horizontal portion $f^4$, and at the outer end are inclined upwardly at $f^5$.

The chain passes around and is driven by the sprocket driving-wheel D².

G is the inlet-opening into the drying-room, and G' the exit-opening from the drying-room. At the inlet-opening and on the outside of the drying-room are the guides H H'. These guides are preferably of sheet metal and at their inner end are separated by a distance approximately equal to the width of the article—for instance, a shirt—carried by the conveyer. From the inner ends the plates flare outwardly, so they form a passage quite wide at the point of approach of the goods and gradually narrowing toward the inlet into the drying-room. At the exit-opening of and within the drying-room are corresponding guides H² H³, which flare outwardly from the inner surface of the exit-opening. By these means the garments to be dried, especially where of large size, are carried with certainty to the inlet-opening into the room and to the exit-opening from the room.

I employ the following mechanism to automatically strip or remove the goods from the pins after passing through the drying-room: On the outside of the drying-room and between the exit and inlet openings I connect to the track the hanger J, which may be secured to the track by means of set-screws. This hanger J has on each side an angle-piece $j$. To each angle-piece $j$ is secured an arm K. Each arm is preferably of metal and is provided with a downwardly and inwardly inclined curved edge $k$. This causes the two arms K to approach each other and to incline. Near the end opposite the hanger J the arms K are slightly bent up at $k^4$, the extreme ends being again bent downward and preferably riveted, welded, or otherwise secured together. The arms K are adjustably secured to the angle-pieces $j$ of the hanger J in the following manner: The angle-pieces are tapped, and the extension $k'$ of the arm K is provided with slots $k^2$. Through these slots pass bolts $k^3$. By this arrangement the vertical position of the arms K may readily be adjusted. The arms K are adjusted so that their free ends lie beneath the conveyer-chain and are not separated at all or are separated by a distance less than the length of the hub $f'$. As the chain approaches the hub $f$ passes between the arms K, while the under surface of the pins F will strike the edge of the arms, and as the arms diverge will travel across these arms until the space between the arms K is greater than the length of the pins, when the pins will pass within the space between the arms K. During this passage of the pins F across the arms K any goods suspended thereon will be stripped from the pins and can then fall into any desired receptacle.

In order to cause the conveyer to approach and be acted upon properly by the arms K, I provide the following mechanism: L is a hanger secured to the track or guideway D, the hanger being secured by set-screws $l$. From opposite sides of this hanger project downwardly the arms $l'$, and formed with or connected to these arms are the longitudinal guides $l^2$. Fixedly connected at one end to the hanger and on each side of the hanger are bars M, the bars extending downward in line with the arms $l'$. Screws $m$ pass through these bars near their lower or free ends and contact with the arms $l$. By adjusting these screws the desired position of the longitudinal guides $l^2$ may be obtained. The end of the longitudinal guides $l^2$ in the direction of the approaching conveyer is slightly flared. The hanger L is adjusted in position upon the track D so that the flared end of the guides $l^2$ will project slightly in advance of the free ends of the arms K, while the other end will extend to a point where the pins F are in the space between the arms K. The guides $l^2$ are adjusted with respect to each other so as to be separated by a distance but slightly greater than the width of the shanks $f$. When the chain E approaches the stripper, the shanks $f$ will pass between the guides $l^2$, preventing lateral movement of the chain, enabling the pins to coact with certainty into the arms K.

Having now fully described my invention, what I claim, and desire to protect by Letters Patent, is—

1. In a drier, in combination with the conveyer-chain having projecting pins thereon for conveying the goods to be dried, of forwardly-extending arms converging toward each other beneath said conveyer, the converging ends of said arms being substantially midway of the conveyer, the arms diverging outwardly beyond the ends of the pins.

2. In a drier, in combination with the conveyer-chain having projecting pins thereon for carrying the goods to be dried, of forwardly-extending arms converging toward each other beneath the conveyer, the converging ends of said arms being secured together substantially midway of the conveyer, the arms diverging outwardly beyond the ends of the pins.

3. In a drier, in combination with the conveyer-chain having projecting pins thereon for carrying the goods to be dried, of forwardly-extending arms converging toward each other beneath the conveyer, the converging ends of said arms being substantially midway of the conveyer, the arms inclining upwardly to the level of the pins and diverging outwardly beyond the ends of the pins.

4. In a drier, in combination with the conveyer-chain having projecting pins thereon for carrying the goods to be dried, of forwardly-extending arms converging toward each other beneath the conveyer, the converging ends of said arms being secured together substantially midway of the conveyer, the arms inclining upward to the level of the pins and diverging outwardly beyond the ends of the pins.

5. In a drier, in combination with the conveyer-chain having projecting pins thereon for conveying the goods to be dried, of forwardly-extending arms converging toward each other beneath said conveyer, the converging ends of said arms being substantially midway of the conveyer, the arms diverging outwardly beyond the ends of the pins, said arms being vertically adjustably supported.

6. In a drier, in combination with the conveyer-chain having projecting pins thereon for carrying the goods to be dried, of forwardly-extending arms converging toward each other beneath the conveyer, the converging ends of said arms being secured together substantially midway of the conveyer, the arms diverging outwardly beyond the ends of the pins, said arms being vertically adjustably supported.

7. In a drier, in combination with the conveyer-chain having projecting pins thereon for carrying the goods to be dried, of forwardly-extending arms converging toward each other beneath the conveyer, the converging ends of said arms being substantially midway of the conveyer, the arms inclining upwardly to the level of the pins and diverging outwardly beyond the ends of the pins, said arms being vertically adjustably supported.

8. In a drier, in combination with the conveyer-chain having projecting pins thereon for carrying the goods to be dried, of forwardly-extending arms converging toward each other beneath the conveyer the converging ends of said arms being secured together substantially midway of the conveyer, the arms inclining upward to the level of the pins and diverging outwardly beyond the ends of the pins, said arms being vertically adjustably supported.

9. In a drier, in combination with the conveyer-chain having projecting pins thereon for carrying the goods to be dried and a track-guideway on which said chain is supported, of a hanger, forwardly-extending arms secured to and projecting downward from said hanger, said arms converging toward each other to a point beneath the conveyer, the converging ends of said arms being substantially midway of the conveyer, the arms diverging outwardly beyond the ends of the pins.

10. In a drier, in combination with the conveyer-chain having projecting pins thereon for carrying the goods to be dried and a track-guideway on which said chain is supported, of a hanger, forwardly-extending arms secured to and projecting downward from said hanger, said arms converging toward each other to a point beneath the conveyer, the converging ends of said arms being secured together substantially midway of the conveyer, the arms diverging outwardly beyond the end of the pins.

11. In a drier, in combination with the conveyer-chain having projecting pins thereon for carrying the goods to be dried and a track-guideway on which said chain is supported, of a hanger, forwardly-extending arms secured to and projecting downward from said hanger, said arms converging toward each other to a point beneath the conveyer, the converging ends of said arms being substantially midway of the conveyer, the arms inclining upwardly to the level of the pins and diverging outwardly beyond the ends of the pins.

12. In a drier, in combination with the conveyer-chain having projecting pins thereon for carrying the goods to be dried and a track-guideway on which said chain is supported, of a hanger, forwardly-extending arms secured to and projecting downward from said hanger, said arms converging toward each other to a point beneath the conveyer, the converging ends of said arms being secured together substantially midway of the conveyer, the arms inclining upwardly to the level of the pins and diverging outwardly beyond the end of the pins.

13. In a drier, in combination with the conveyer-chain having projecting pins thereon for carrying the goods to be dried and a track-guideway on which said chain is supported, of a hanger, forwardly-extending arms vertically adjustably secured to and projecting downward from said hanger, said arms converging toward each other to a point beneath the conveyer, the converging ends of said arms being substantially midway of the conveyer, the arms diverging outwardly beyond the ends of the pins.

14. In a drier, in combination with the conveyer-chain having projecting pins thereon for carrying the goods to be dried and a track-guideway on which said chain is supported of a hanger, forwardly-extending arms vertically adjustably secured to and projecting downward from said hanger, said arms converging toward each other to a point beneath the conveyer, the converging ends of said arms being secured together substantially midway of the conveyer, the arms diverging outwardly beyond the end of the pins.

15. In a drier, in combination with the conveyer-chain having projecting pins thereon for carrying the goods to be dried, and a track-guideway on which said chain is supported, of a hanger, forwardly-extending arms vertically adjustably secured to and projecting downward from said hanger, said arms converging toward each other to a point beneath the conveyer, the converging ends of said arms being substantially midway of the conveyer, the arms inclining upwardly to the level of the pins and diverging outwardly beyond the ends of the pins.

16. In a drier, in combination with the conveyer-chain having projecting pins thereon for carrying the goods to be dried and a track-guideway on which said chain is supported, of a hanger, forwardly-extending arms vertically adjustably secured to and projecting downward from said hanger, said arms converging toward each other to a point beneath the conveyer, the converging ends of said arms being secured together substantially midway of the conveyer, the arms inclining upwardly to the level of the pins and diverging outwardly beyond the end of the pins.

17. In a drier, in combination with a conveyer and stripping-arms extending forwardly for the same, of guides between which the conveyer passes on approaching and being acted on by the stripping-arms, said guides holding the conveyer from substantial lateral movement.

18. In a drier, in combination with a conveyer and stripping-arms extending forwardly for the same, of guides between which the conveyer passes on approaching and being acted on by the stripping-arms, said guides holding the conveyer from substantial lateral movement, and means to move the arms toward and from each other.

19. In a drier, in combination with a conveyer and stripping-arms extending forwardly for the same, of arms carrying longitudinal guides projecting beyond the stripping-arms and between which guides the conveyer passes in approaching and being acted on by the stripping-arms.

20. In a drier, in combination with a conveyer and stripping-arms extending forwardly for the same, of arms carrying longitudinal guides projecting beyond the stripping-arms and between which guides the conveyer passes in approaching and being acted on by the stripping-arms, and means to move the arms toward and from each other.

21. In a drier, in combination with a conveyer, a track upon which said conveyer is supported and stripping-arms extending forwardly to remove the goods from said conveyer, of a hanger secured to said track having depending arms, longitudinal guides at the end of said arms between which guides the conveyer passes in approaching and being acted upon by said stripper-arms.

22. In a drier, in combination with a conveyer, a track upon which said conveyer is supported and stripping-arms extending forwardly to remove the goods from said conveyer, of a hanger secured to said track having resilient depending arms, longitudinal guides at the end of said arms between which guides the conveyer passes in approaching and being acted upon by said stripper-arms, and means to force said arms toward each other.

23. In a drier, in combination with a conveyer, a track upon which said conveyer is supported and stripping-arms extending forwardly to remove the goods from said conveyer, of a hanger secured to said track having resilient depending arms, longitudinal guides at the end of said arms between which guides the conveyer passes in approaching and being acted upon by said stripper-arms, arms fixedly secured to said hanger and projecting downward in line with said resilient arms and screws passing through said fixed arms and contacting with said resilient arms.

24. In a drier, in combination with the conveyer-chain having projecting pins thereon for conveying the goods to be dried, of forwardly-extending arms converging toward each other beneath the conveyer, the arms diverging outwardly beyond the ends of the pins.

In testimony of which invention I have hereunto set my hand, at Philadelphia, on this 13th day of February, 1901.

WILLIAM M. BARNES.

Witnesses:
  M. F. ELLIS,
  M. M. HAMILTON.